(12) United States Patent
Makwana et al.

(10) Patent No.: US 11,901,763 B2
(45) Date of Patent: Feb. 13, 2024

(54) DRIVER FOR EMERGENCY LIGHTING MEANS

(71) Applicant: Tridonic GmbH & Co KG, Dornbirn (AT)

(72) Inventors: Deepak Makwana, Newcastle Upon Tyne (GB); Jagjitpati Shukla, Spennymoor County Durham (GB)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 17/790,972

(22) PCT Filed: Jan. 14, 2021

(86) PCT No.: PCT/EP2021/050623
§ 371 (c)(1),
(2) Date: Jul. 6, 2022

(87) PCT Pub. No.: WO2021/144329
PCT Pub. Date: Jul. 22, 2021

(65) Prior Publication Data
US 2023/0022976 A1 Jan. 26, 2023

(30) Foreign Application Priority Data
Jan. 17, 2020 (EP) ...................... 2000841

(51) Int. Cl.
*H02J 9/02* (2006.01)
*H05B 47/17* (2020.01)
*H05B 47/19* (2020.01)

(52) U.S. Cl.
CPC ............ *H02J 9/02* (2013.01); *H05B 47/17* (2020.01); *H05B 47/19* (2020.01)

(58) Field of Classification Search
CPC .... H02J 9/02; H02J 9/00; H05B 47/17; H05B 47/19; H05B 47/10; H05B 47/00; H05B 47/175; F21V 23/00; F21V 99/00
See application file for complete search history.

(56) References Cited

U.S. PATENT DOCUMENTS

| | | | |
|---|---|---|---|
| 2012/0068611 A1* | 3/2012 | Steiner ................. | H05B 47/115 315/158 |
| 2013/0147397 A1* | 6/2013 | McBryde .................. | H02J 9/02 315/312 |
| 2018/0227998 A1* | 8/2018 | Polychronakis ..... | H05B 47/115 |

FOREIGN PATENT DOCUMENTS

| EP | 3358910 A1 | 8/2018 |
|---|---|---|
| EP | 2282612 B1 | 7/2019 |
| EP | 3541147 A1 | 9/2019 |

OTHER PUBLICATIONS

PCT/EP2021/050623, International Search Report and Written Opinion dated Mach 24, 2021, 12 pages.

* cited by examiner

*Primary Examiner* — Bao Q Truong
(74) *Attorney, Agent, or Firm* — Andrus Intellectual Property Law, LLP (57) ABSTRACT

The invention relates to a driver (100) for emergency lighting means (101), comprising output terminals (111*a-b*) for electrically supplying at least one emergency lighting means (101), and a test switch (103) for starting a test routine controlled by a controller (109) of the driver (100), wherein the driver (100) is settable to a commissioning mode if the test switch (103) is activated according to a predefined operation pattern defined by time durations and/or repetition criteria of the operation pattern.

13 Claims, 5 Drawing Sheets

DRIVER FOR EMERGENCY LIGHTING MEANS

CROSS REFERENCE TO RELATED APPLICATIONS

The present application is the U.S. national stage application of international application PCT/EP2021/050623 filed Jan. 14, 2021, which international application was published on Jul. 22, 2021 as International Publication WO 2021/144329 A1. The international application claims priority to European Patent Application No. 2000841.3 filed Jan. 17, 2020.

TECHNICAL FIELD OF THE INVENTION

The invention relates to the commissioning of emergency lighting means. In particular, the invention relates to a driver for emergency lighting means and a method for commissioning such a driver. The invention further relates to an emergency lighting system.

BACKGROUND OF THE INVENTION

Emergency lighting systems enable a quick and safe evacuation of buildings in an emergency situation, for instance during a fire alarm.

Such emergency lighting systems usually comprise a plurality of emergency luminaires, which are installed in many different places in the building. These emergency luminaires can be wireless, i.e. they comprise a driver with a wireless communication interface for exchanging communication data.

Such emergency luminaires are usually provided with a test switch for activating various test functions, as well as a status LED for indicating the test functions. The test switch and the status LED are typically arranged on a housing of the driver. An emergency luminaire with such a status LED and test switch is, for instance, disclosed in document EP 2 282 612 B1.

After installing such luminaires, they are usually commissioned. During commissioning a room or group number is, for instance, allocated to each luminaire.

In order to commission a wireless emergency luminaire, it is known to use dedicated hand held instruments. These devices are developed particularly for commissioning and/or provisioning of the luminaires and communicate with the luminaires via Bluetooth, Infrared or NFC interfaces. However, such devices are expensive and can be cumbersome to operate.

It is also known, to commission wireless emergency luminaires via a smartphone, in particular using a wireless communication interface of the smartphone. However, in order to use a smartphone for this purpose a dedicated application (App) needs to be developed, which is expensive.

Furthermore, to commission a wireless emergency luminaires with a dedicated device or smartphone, an additional communication interface is required on the luminaire to communicate with the device, e.g. a NFC interface. A NFC interface can have the further disadvantage that it requires an additional IC at the luminaire to harness energy from an NFC antenna, for storing the commissioning information. This further increases the cost and complexity of the luminaire.

Thus, it is an objective to provide an efficient and cost saving commissioning of emergency lighting means, in particular without using external devices.

SUMMARY OF THE INVENTION

The object of the present invention is achieved by the solution provided in the enclosed independent claims. Advantageous implementations of the present invention are further defined in the dependent claims.

According to a first aspect, the invention relates to a driver for an emergency lighting means, comprising output terminals for electrically supplying at least one emergency lighting means, and a test switch for starting a test routine controlled by a controller of the driver, wherein the driver is settable to a commissioning mode if the test switch is activated according to a predefined operation pattern defined by time durations and/or repetition criteria of the operation pattern. This achieves the advantage that the driver and the connected emergency lighting means can be commissioned efficiently and without using external devices.

The driver can be a converter or can comprise a converter of the emergency lighting means, in particular for providing a DC power supply to the emergency lighting means.

The driver can comprise an AC input, for receiving an AC mains voltage, e.g. 230 V and can be configured to detect an emergency situation if the AC mains voltage fails. The driver can comprise an electrical energy storage, e.g. a battery, for providing an energy supply to the emergency lighting means during such an emergency situation.

The emergency lighting means can be an emergency luminaire, in particular an emergency light or an illuminated escape sign. The emergency lighting means can comprise an LED light source, e.g. an LED module or an LED track.

The emergency lighting means can further comprise a sensor, e.g. a motion, a smoke or a light sensor, a control unit or a user interface, e.g. a dimmer or a touchscreen.

The output terminals can be connection pins on the housing of the driver for electrically connecting the emergency lighting means.

The test switch can be a pushbutton on a housing of the driver. In particular, the test switch is configured to register for how long the switch is manually pressed by a user.

The test routine can be a test routine of the driver and/or of the emergency lighting means. During the test routine various functions of the driver and/or the emergency lighting means that are to be executed during an emergency situation can be tested, e.g. providing a power supply to the lighting means via a battery, activating the lighting means etc.

In an embodiment, the driver comprises a visual status indicator, in particular a status LED, wherein the visual status indicator is active during the test routine, and wherein the visual status indicator is configured to furthermore visually signal if the driver is set to the commissioning mode. This provides the advantage that the activation of the commissioning mode can be indicated efficiently to a user.

The visual status indicator can comprise a two-colored or multi-colored status LED. Upon setting the driver to the commissioning mode, the status LED can change color, e.g. from green to red, and/or change from a permanent light to a flashing light.

The visual status indicator can be arranged on a housing of the driver.

In an embodiment, activating the test switch according to the predefined operation pattern comprises pressing the test switch for a time interval T, with $t_{min} \leq T \leq t_{max}$, wherein $t_{min}$ and $t_{max}$ are a minimum and a maximum reference time interval, respectively. This achieves the advantage that the commissioning mode can be activated easily and without requiring external devices. For instance, $t_{min}$ is 5 seconds and $t_{max}$ is 10 seconds.

In an embodiment, the driver is configured to start the test routine if the test switch is pressed for a time interval that is shorter than the minimum reference time interval $t_{min}$ for setting the driver to the commissioning mode.

In an embodiment, the driver is configured to start the test routine if the test switch is activated according to a first operation pattern, and the driver is configured to be set to the commissioning mode if the test switch is activated according to a second operation pattern different to the first operation pattern. This achieves the advantage that the commissioning mode can be activated easily and without requiring external devices.

The first operation pattern can correspond to manually pressing the test switch for a first time interval, and the second operation pattern can correspond to manually pressing the test switch for a second time interval, different to the first time interval. In particular, the first time interval is shorter than the second time interval.

The visual status indicator can be configured to signal the starting of the test routine, e.g. by changing to another color and/or flashing with a certain frequency.

In an embodiment, the driver in the commissioning mode is configured to receive commissioning data by a subsequent operation of the test switch. This achieves the advantage that the driver and the corresponding lighting means can be commissioned efficiently and without using external devices.

Preferably, the test switch is an interface for inputting commissioning data if the driver is in the commissioning mode.

In an embodiment, the commissioning data refers to a location of the emergency lighting means, in particular a room number, and/or an assignment of the emergency lighting means to a group of lighting means.

In an embodiment, the controller is configured to commission the driver based on the received commissioning data. This achieves the advantage that the driver respectively illumination means can be commissioned efficiently.

Preferably, the controller is configured to store the commissioning data, e.g. room number or associated group of the emergency lighting means, in a memory of the driver.

In an embodiment, the visual status indicator is further configured to visually signal the receipt of the commissioning data and/or the successful commissioning of the driver.

In an embodiment, the driver comprises a communication interface, in particular a wireless communication interface and/or a wire bound communication interface.

The wireless communication interface can be a Bluetooth interface; the wire bound communication interface can be a DALI interface.

The driver can be connected to other drivers for emergency lighting means and/or to a control unit via the wireless or wire bound communication interface.

In an embodiment, the driver is configured to forward commissioning information, in particular the commissioning data, via the communication interface to a central unit, in particular a cloud storage. This achieves the advantage that the commissioning information of the driver can be centrally stored and retrieved.

The commissioning information can comprise the commissioning data, which was entered via the test switch while the driver was in the commissioning mode. The commissioning information can comprise an updated floor plan which contains the location of emergency lighting means.

According to a second aspect, the invention relates to an emergency lighting system, comprising a plurality of drivers for emergency lighting means according to the first aspect of the invention, wherein the drivers are configured to form a mesh network. This achieves the advantage that the drivers and the connected emergency lighting means can be commissioned efficiently and without using external devices.

Preferably, each driver of the system comprises a wireless communication interface, in particular a Bluetooth interface, wherein the drivers are configured to form the mesh network via the communication interfaces.

The system can comprise the emergency lighting means that are supplied by the drivers.

In an embodiment, the system comprises a central unit, in particular a cloud storage, wherein the drivers are configured to forward commissioning information, in particular commissioning data of each driver, to the central unit via the mesh network. This achieves the advantage that the commissioning information of each driver and/or emergency lighting means can be centrally stored and retrieved.

The central unit can be configured to store the commissioning information of each driver and/or emergency lighting means in a look-up-table.

According to a third aspect, the invention relates to a method for commissioning a driver for emergency lighting means, wherein the driver has a test switch for starting a test routine controlled by a controller of the driver, the method comprising the steps of: setting the driver to a commissioning mode by activating the test switch according to a predefined operation pattern defined by time durations and/or repetition criteria of the operation pattern, and inputting commissioning data by a subsequent operation of the test switch. This achieves the advantage that the driver and the connected emergency lighting means can be commissioned efficiently and without using external devices.

Preferably, the method comprises the further step of: commissioning the driver according to the commissioning data, e.g. by storing the commissioning data in a memory of the driver.

In an embodiment, the setting of the driver to the commissioning mode, the inputting of commissioning data and/or a successful commissioning of the driver are visually signaled by means of a visual status indicator, in particular a status LED, of the driver. This provides the advantage that the commissioning of the driver can be indicated efficiently to a user.

In an embodiment, the method comprises the further step of: forwarding commissioning information, in particular the commissioning data, to a central unit via a communication interface of the driver. This achieves the advantage that the commissioning information can be centrally stored and retrievable.

The central unit can comprises a memory or can be connected to a memory, e.g. a cloud storage.

BRIEF DESCRIPTION OF THE DRAWINGS

The invention will be explained in the followings together with the figures.

DETAILED DESCRIPTION OF THE PREFERRED EMBODIMENTS

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of a driver for an emergency lighting means will be presented. However, as those skilled in the art will readily appreciate, these aspects may be extended to aspects of drivers and converters for lighting means, in particular luminaires, in general without departing from the invention.

The term "LED luminaire" shall mean a luminaire with a light source comprising one or more LEDs. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Figure 1:
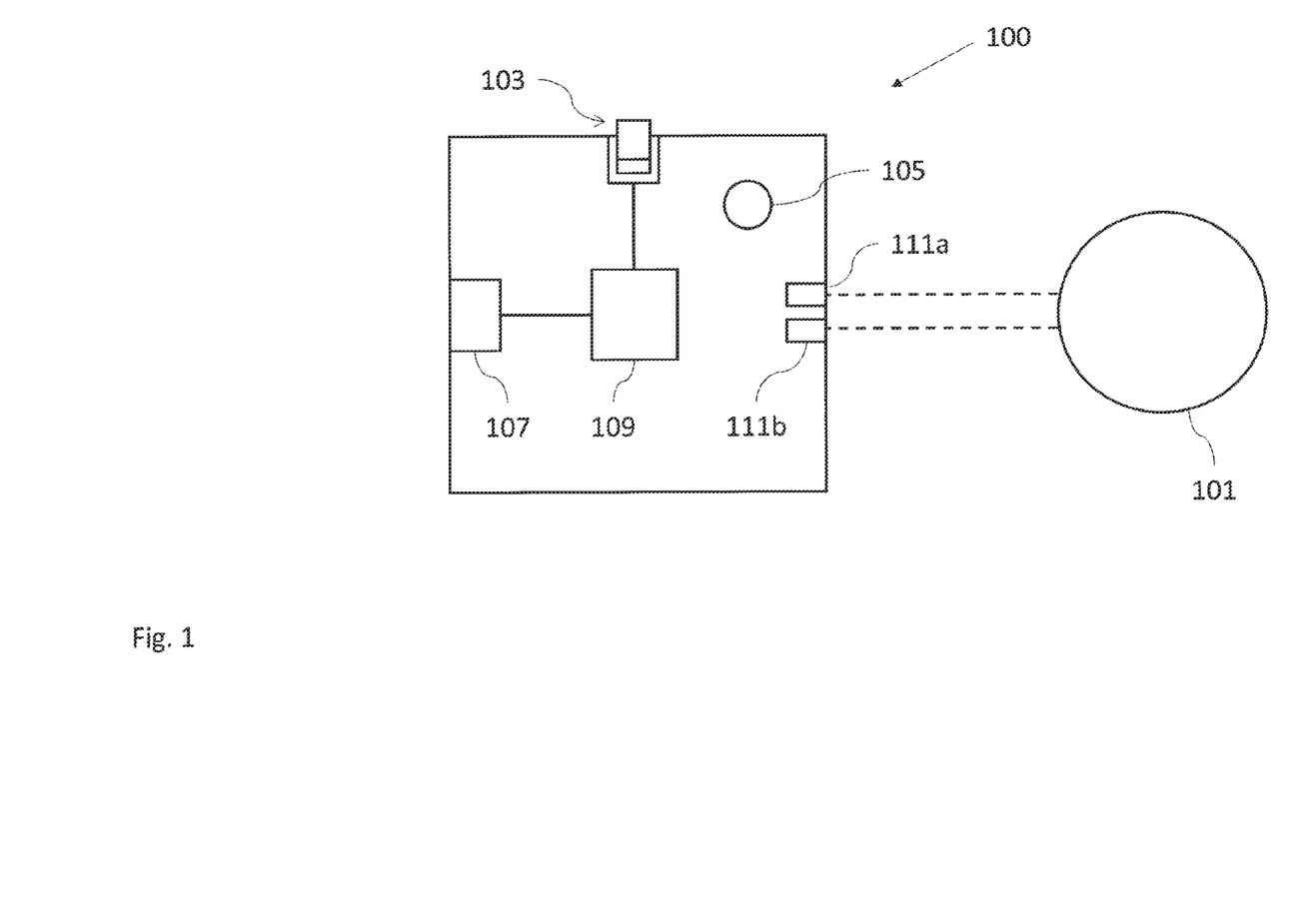
FIG. 1 shows a schematic diagram of a driver for emergency lighting means according to an embodiment.

FIG. 1 shows a schematic diagram of a driver 100 for emergency lighting means 101 according to an embodiment.

The driver 100 comprises output terminals 111a-b for electrically supplying at least one emergency lighting means 101, and a test switch 103 for starting a test routine controlled by a controller 109 of the driver 100, wherein the driver 100 is settable to a commissioning mode if the test switch 103 is activated according to a predefined operation pattern defined by time durations and/or repetition criteria of the operation.

The emergency lighting means 101 can be an emergency luminaire, e.g. an emergency light or an illuminated escape sign. The emergency lighting means 101 can comprise an LED light source, e.g. an LED module or an LED track.

The emergency lighting means 101 can further comprise a sensor, e.g. a motion, a smoke or light sensor, a control unit or a user interface, e.g. a dimmer or a touchscreen.

The emergency lighting means 101 can be electrically connected to the output terminals 111a-b of the driver.

The test switch 103 can be a pushbutton on a housing of the driver 100. The test switch 103 can be configured to register for how long the switch 103 is pressed by a user.

Preferably, the test switch 103 is configured to active a test routine of the driver 100 and/or of the emergency lighting means 101 if the test switch 103 is activated according to a first operation pattern e.g. manually pressed for a first time interval. In particular, the first operation pattern is different to the predefined operation pattern for setting the driver 100 to the commissioning mode.

During the test routine, various functions of the driver 100 and/or the emergency lighting means 101 can be tested, e.g. providing a DC power supply to the emergency lighting means 101 via an internal battery of the driver 100 or activating the lighting means 101.

The test switch 103 can be configured to set the driver 100 to the commissioning mode if it is activated according to a second operation pattern, which is different to the first operation pattern for starting the test routine. In particular, the second operation pattern corresponds to the predefined operation pattern above.

Preferably, the predefined operation pattern, respectively second operation pattern, corresponds to manually pressing the test switch for a time interval T, with $t_{min} \leq T \leq t_{max}$, wherein $t_{min}$ and $t_{max}$ are a minimum and a maximum reference time interval, respectively. For instance, $t_{min}$ is 5 seconds and $t_{max}$ is 10 seconds.

The driver 100 can comprise a visual status indicator 105, in particular a status LED or a plurality of status LEDs. The visual status indicator 105 can be arranged on a housing of the driver 100.

The visual status indicator 105 can be active during the test routine, i.e. it visually signals if the test routine is executed. The visual status indicator 105 can further be configured to visually signal an error of the driver 100 or the emergency lighting means 101.

The visual status indicator 105 can further be configured to signal if the driver 100 is set to the commissioning mode and/or if the test routine is started. Preferably, the visual status indicator 105 uses different signaling patterns, e.g. different LED colors, to signal different states and functions of the driver 100.

Preferably, the driver 100 in the commissioning mode is configured to receive commissioning data by a subsequent operation of the test switch 103. In particular, the subsequent operation comprises further manual operation patterns of the test switch defined by time durations and/or repetition criteria of the further operation patterns.

In other words: In the commissioning mode, the test switch 103 becomes an interface for inputting commissioning data to the driver 100.

The visual status indicator 105 can be configured to confirm each input on the test switch 103, e.g. by flashing each time the switch 103 is manually pressed.

The commissioning data can refer to a particular room in which the emergency lighting means 101 is arranged and/or a group number, wherein the group number represents a group of lighting means to which the emergency lighting means 101 is to be assigned.

The controller 109 of the driver 100 can be a processing unit 109, for instance a microcontroller or an ASIC.

The controller 109 can be configured to commission the driver 100 based on the received commissioning data. In particular, the controller 109 is configured to store the commissioning data in a memory of the driver 100.

The visual status indicator 105 can be configured to confirm a successful commissioning of the driver 100 by means of a visual signal.

The driver 100 can further comprise a communication interface 107. The communication interface 107 can be a wireless communication interface, e.g. a Bluetooth, a NFC or an infrared interface, or a wire bound interface, e.g. a DALI interface.

The communication interface 107 can be configured to forward commissioning information to a central unit. The central unit can comprise a memory or can be connected to a memory, in particular a cloud storage.

For instance, if the communication interface 107 is a DALI interface, the commissioning information can be forwarded to the central unit via a DALI bus connected to the DALI interface.

The commissioning information can comprise the commissioning data, which was entered via the test switch while the driver 100 was set to the commissioning mode.

Preferably, the driver 100 comprises an AC input for receiving an AC mains voltage, a converter, in particular an AC/DC converter, and/or an electrical energy storage, e.g. a battery for providing an energy supply to the emergency lighting means 101 in an emergency situation.

The driver 100 and the emergency lighting means 101 are depicted as separate devices in FIG. 1. Alternatively, the emergency lighting means 101 can comprise the driver 100, i.e. the driver 100 can be a component of the emergency lighting means 101.

In particular, the commissioning of the driver 100 corresponds to a commissioning of the emergency lighting means 101 and vice versa.

Preferably, in addition to the commissioning via the test switch 103, the driver 100 can still receive commissioning data from an external device, e.g. a smartphone, via the communication interface 107.

Figure 2:
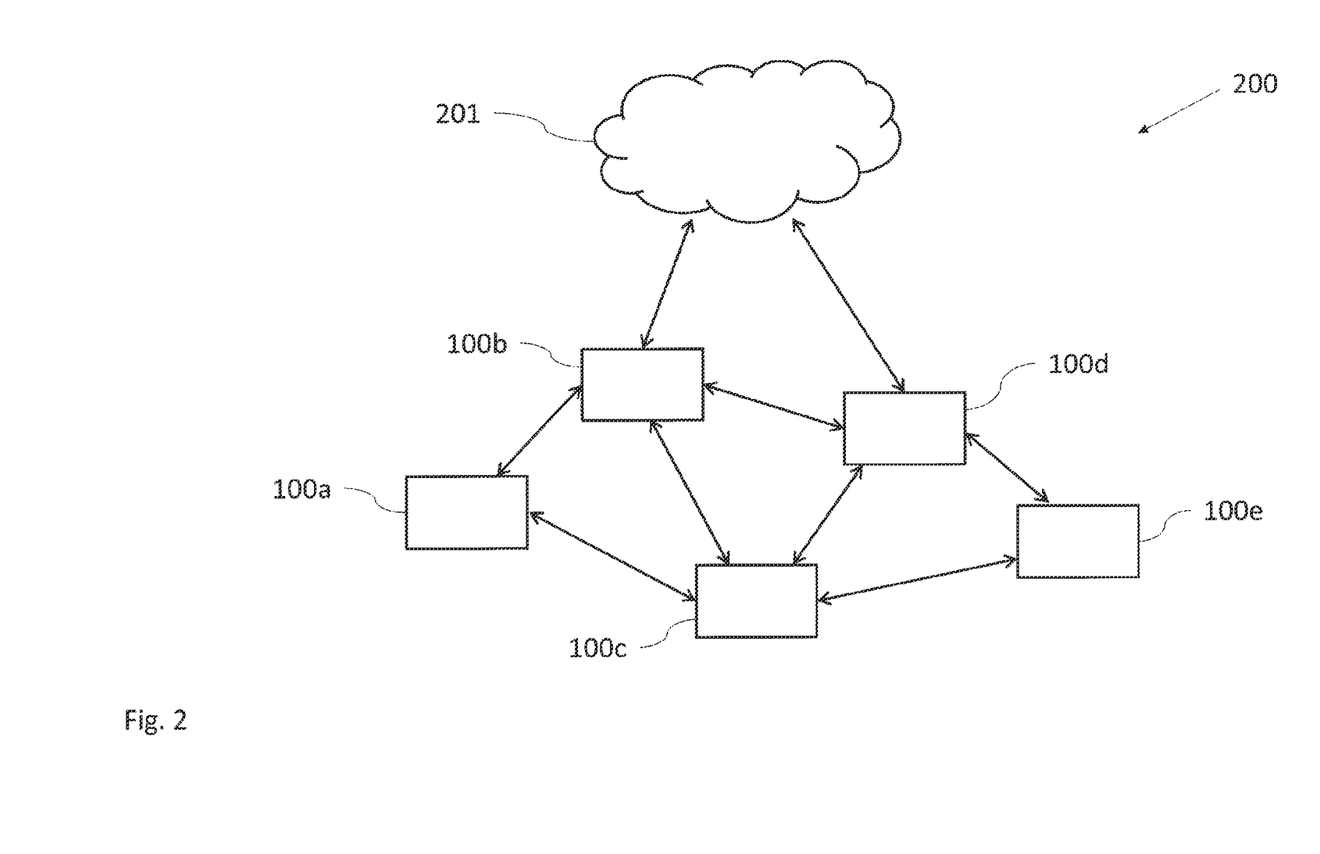
FIG. 2 shows a schematic diagram of an emergency lighting system according to an embodiment.

FIG. 2 shows a schematic diagram of an emergency lighting system 200 according to an embodiment.

The emergency lighting system 200 comprises a plurality of drivers 100a-e for emergency lighting means 101, wherein the drivers 100a-e are configured to form a mesh network.

The drivers 100a-e shown in FIG. 2 can correspond to the driver 100 depicted in FIG. 1.

Preferably, each driver 100a-e in the system comprises a wireless communication interface, in particular a Bluetooth interface, which is configured to establish a communication connection to neighboring drivers 100a-e for forming the mesh network. Preferably, the mesh network is a wireless network, in particular a Bluetooth network.

Furthermore, the system can comprise a central unit 201. The central unit 201 can be a data processing apparatus. The central unit 201 can comprise a memory or can be connected to a memory, in particular a cloud storage. The drivers 100a-e can be configured to forwarding its commissioning information to the central unit 201 via the mesh network.

The central unit 201 can be configured to store the commissioning information of the drivers 100a-e and/or connected emergency lighting means in the memory, e.g. the room number and assigned group of each of the emergency lighting means connected to the drivers 100a-e.

The system 200 can comprise the emergency lighting means that are controlled by the drivers 100a-e.

Figure 3:
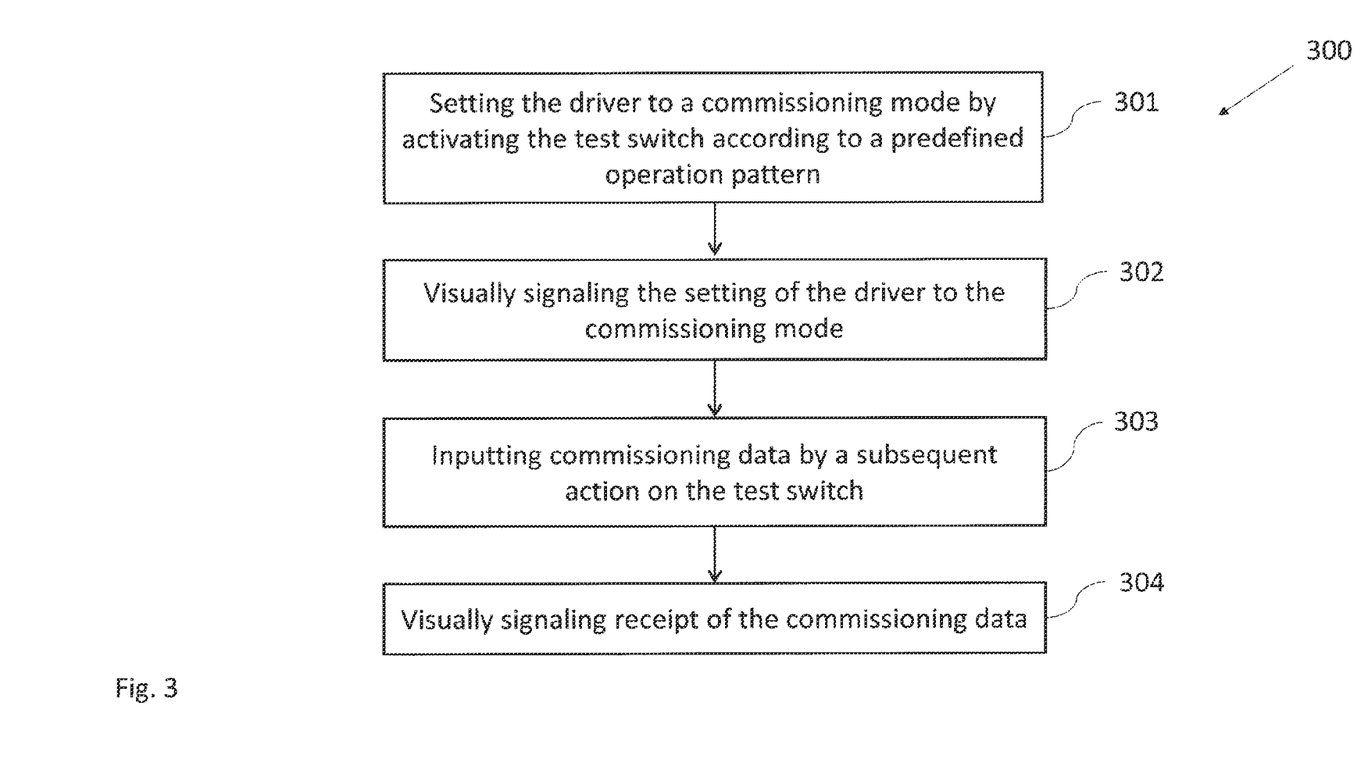
FIG. 3 shows a schematic diagram of a method for commissioning a driver for emergency lighting means according to an embodiment.

FIG. 3 shows a schematic diagram of a method 300 for commissioning the driver 100 for emergency lighting means 101 according to an embodiment.

The method 300 comprises the steps of:
setting 301 the driver 100 to a commissioning mode by activating the test switch 103 according to a predefined operation pattern defined by time durations and/or repetition criteria of the operation pattern, and
inputting 303 commissioning data by a subsequent operation of the test switch 103.

Subsequently, the commissioning information, in particular the commissioning data, can be forwarded to the central unit 201, in particular via the communication interface 107 of the driver 100.

The method 300 in FIG. 3 comprises the further optional steps of visually signaling 302 the setting of the driver to the commissioning mode, and visually signaling 304 receipt of the commissioning data, in particular by the visual status indicator 105 of the driver 100.

The method 300 can comprise the further step of commissioning the driver 100 according to the commissioning data, for instance by the controller 109 of the driver 100.

The visual status indicator 105 of the driver 100 can further signal the successful commissioning of the driver 100.

The method 300 can be performed by the driver 100 as shown in FIG. 1 and/or by the drivers 100a-e shown in FIG. 2.

If more than one emergency lighting means 101 are connected to the driver, the method 300 can be repeated for each emergency lighting means 101 connected to the driver.

Figure 4:
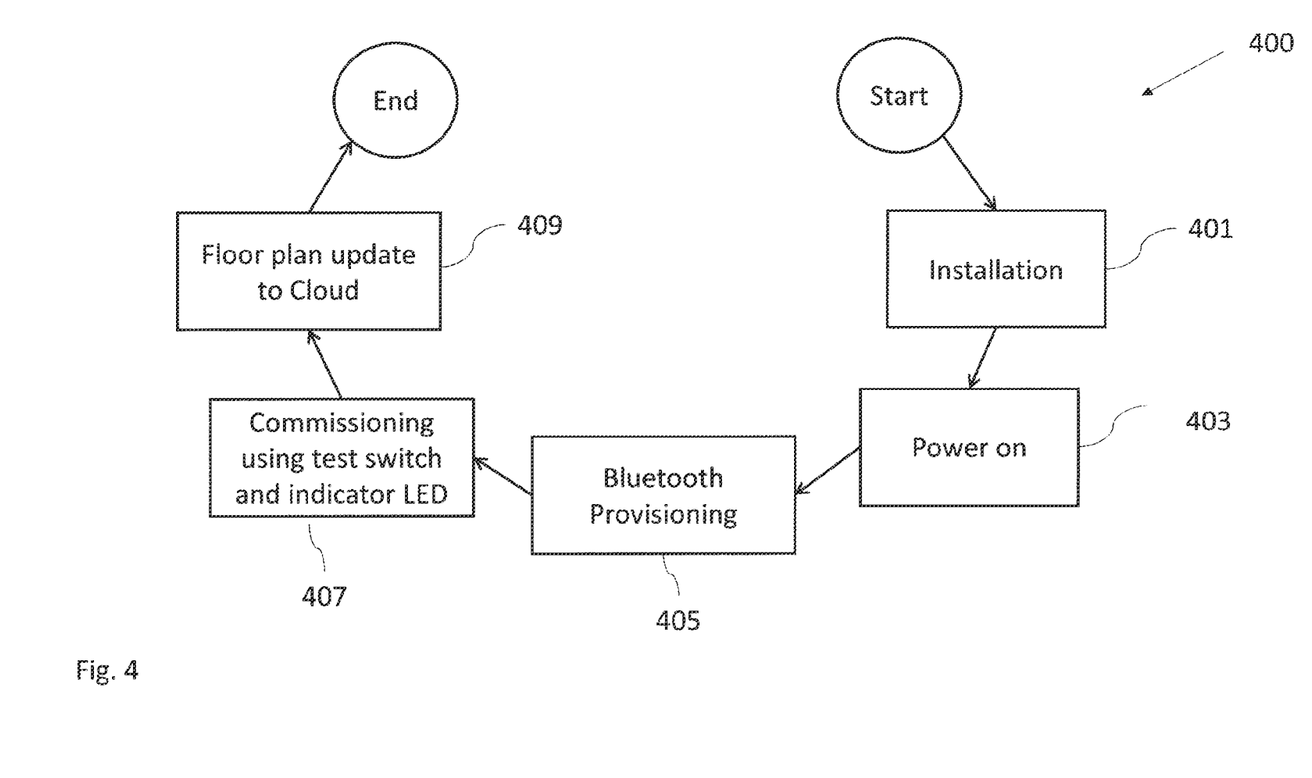
FIG. 4 shows a schematic diagram of a method for installing and commissioning of an emergency lighting system according to an embodiment.

FIG. 4 shows a schematic diagram of a method 400 for installing and commissioning of an emergency lighting system according to an embodiment.

The method 400 as shown in FIG. 4 can be performed with the emergency lighting system 200 as shown in FIG. 2. In particular, the emergency lighting system 200 comprises emergency lighting means 101 having drivers 100a-e with Bluetooth communication interfaces.

The method 400 comprises the step of installing 401 the emergency lighting means 101, i.e. installing the lighting means 101 and the drivers 100a-e. The lighting means 101 and the drivers 100a-e are typically installed in a room of a building, wherein each drivers 100a-e is connected to an AC mains of the building and is electrically connected to the corresponding emergency lighting means 101.

The method 400 comprises the further steps of powering on 403 the drivers 100a-e, and subsequently performing a Bluetooth provisioning 405 of the drivers 100a-e, i.e. generating a mesh network of emergency lighting means 101 via the Bluetooth interfaces of their drivers 100a-e.

Subsequently the emergency lighting means 101 are commissioned 407 using the test switch and the indicator LED on their drivers 100a-e. The commissioning 407 of each lighting means 101 and its driver 100a-e can be performed according to the method 300 as shown in FIG. 3.

Finally, the method 400 comprises the step of saving 409 an updated floor plan to a cloud. This can be realized by forwarding commissioning information of the emergency lighting means 101 via the mesh network to a cloud storage and saving the commissioning information in a floor plan stored in the cloud.

Figure 5:
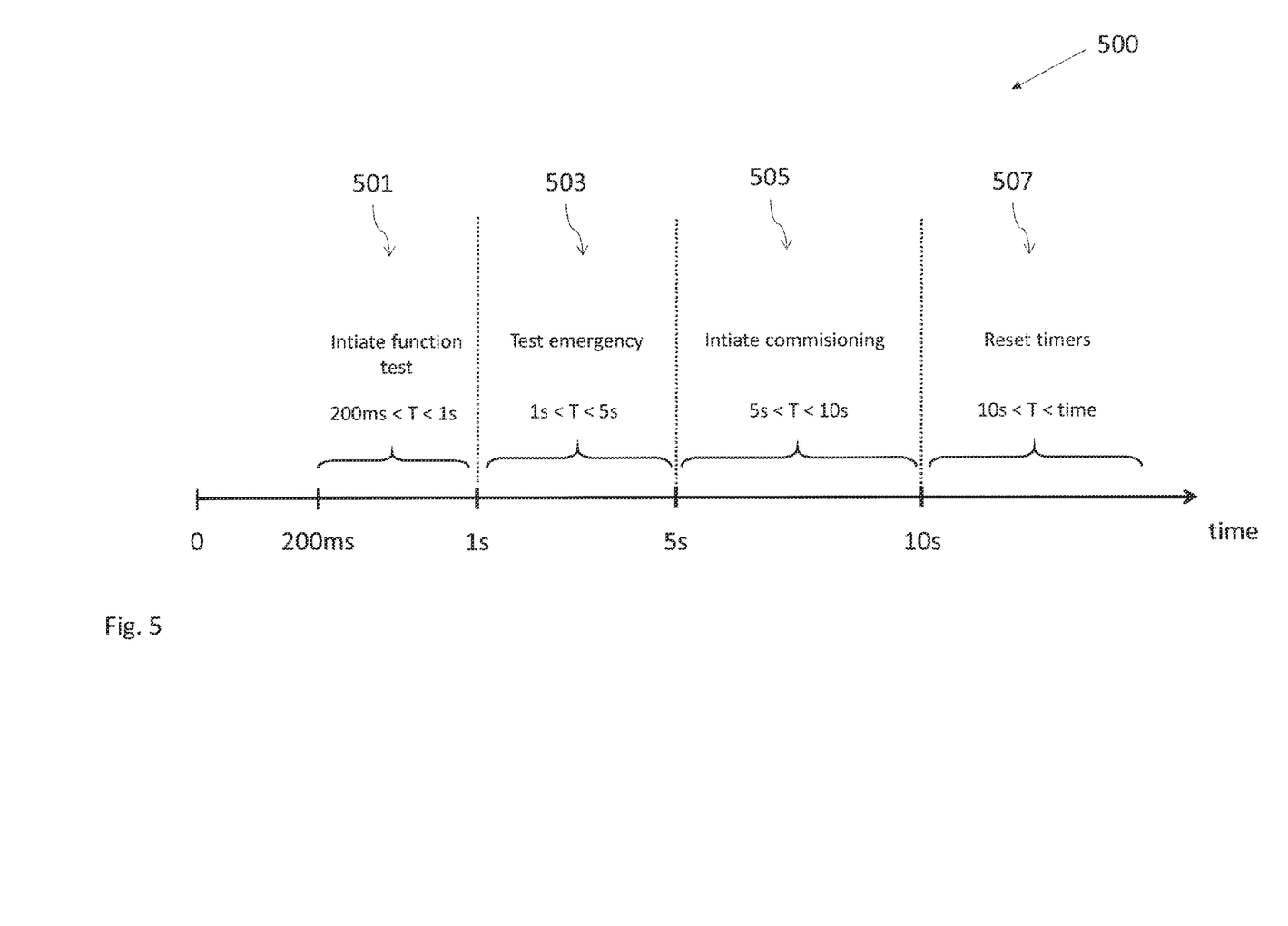
FIG. 5 shows a schematic diagram of an activation protocol for a test switch according to an embodiment.

FIG. 5 shows a schematic diagram of an activation protocol 500 for the test switch 103 according to an embodiment.

Preferably, the activation protocol 500 determines which action is triggered when the test switch 103 is pressed for certain time intervals.

Preferably, as long as the test switch 103 is not pressed the driver 100 is in a default mode with no lamp or battery fault. The default mode can be a maintained, stand-by and/or normal mode of the driver 100. In this default mode, the visual status indicator 105, for instance, lights up green continuously.

If the test switch 103 is pressed for a first time interval 501, the driver 100 can initiate a function test. The function test can comprise a test of the basic functions of the driver and can last for 5 seconds. The first time interval 501 can be between 200 ms and 1 s. The visual status indicator can signal the function test, e.g. by the status LED quickly flashing in green.

If the test switch 103 is pressed for a second time interval 503, the driver 100 can initiate an emergency test. The emergency test can comprise a test of the emergency functions of the driver 100, e.g. power supply of the emergency lighting means 101 via the energy storage of the driver. The second time interval 503 can be between 1 s and 5 s. The visual status indicator 105 can signal the emergency test, e.g. by the status LED quickly slowly in green.

If the test switch 103 is pressed for a third time interval 505, the driver 100 can be set to the commissioning mode. The third time interval 505 can be between 5 s and 10 s. The visual status indicator 105 can signal the setting of the driver 100 to the commissioning mode, e.g. by signaling a red light with brief double green flashes.

In the commissioning mode, the driver 100 can be commissioned by a user. The time out for this mode can be 2 mins, i.e. if no commissioning input is registered within 2 mins after starting the commissioning mode, the driver returns to the default mode.

In the commissioning mode, the user can input commissioning data by pressing the switch for at least one second for a number of times, wherein the number of times corresponds to a room number or a group number to be assigned to the emergency lighting means 101. Each time the test switch 103 is pressed, the status LED 105 can flash green for one second to confirm the input.

The commissioning can be done in two phases. After initiating the commissioning mode, the room number is input by pressing the switch for the appropriate number of times. If the correct room number is set, the user can interrupt the input for more than 2 min. The room number is than allocated to the driver 100 and the status LED 105 changes its color to red with brief triple green flashes.

Subsequently, the user can input the group number in the same way (by pressing the switch 103 for a number of times corresponding to the group number for longer than one second).

After the group number is set, the commissioning can be finished by not pressing the switch for more than 2 mins.

The user can repeat the above process for all further emergency lighting means 101 that are connected to the driver 100.

If the test switch 103 is pressed for a fourth time interval 507, e.g. longer than 10 s, all timers can be reset.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. A driver (100) for emergency lighting means (101), comprising:
output terminals (111a-b) for electrically supplying at least one emergency lighting means (101), and
a test switch (103) for starting a test routine controlled by a controller (109) of the driver (100),
wherein the driver (100) is set to a commissioning mode, and not the test routine, if the test switch (103) is activated according to a predefined operation pattern defined by time durations and/or repetition criteria of the operation pattern,
the driver (100) in the commissioning mode is configured to receive commissioning data by a subsequent operation of the test switch (103), and
the commissioning data refers to a location of the emergency lighting means (101), in particular a room number, and/or an assignment of the emergency lighting means (101) to a group of lighting means.

2. The driver (100) according to claim 1, wherein the driver (100) comprises a visual status indicator (105), in particular a status LED, wherein the visual status indicator (105) is active during the test routine, and wherein the visual status indicator (105) is configured to furthermore visually signal if the driver (100) is set to the commissioning mode.

3. The driver (100) according to claim 1, wherein activating the test switch (103) according to the predefined operation pattern comprises pressing the test switch (103) for a time interval T, with $t_{min} \leq T \leq t_{max}$, wherein $t_{min}$ and $t_{max}$ are a minimum and a maximum reference time interval, respectively.

4. The driver (100) according to claim 3, wherein the driver (100) is configured to start the test routine if the test switch is pressed for a time interval that is shorter than the minimum reference time interval $t_{min}$ for setting the driver to the commissioning mode.

5. The driver (100) according to claim 1, wherein the controller (109) is configured to commission the driver (100) based on the commissioning data.

6. The driver (100) according to claim 1, wherein a visual status indicator (105) is further configured to visually signal the receipt of the commissioning data and/or the successful commissioning of the driver (100).

7. The driver (100) according to claim 1 wherein the driver (100) comprises a communication interface (107), in particular a wireless communication interface and/or a wire bound communication interface.

8. The driver (100) according to claim 1, wherein the driver (100) is configured to forward commissioning information, in particular the commissioning data, via the communication interface (107) to a central unit (201), in particular a cloud storage.

9. An emergency lighting system (200), comprising a plurality of drivers (100a-e) for emergency lighting means according to claim 1, wherein the drivers (100a-e) are configured to form a mesh network.

10. An emergency lighting system (200) according to claim 9, wherein the system (200) comprises a central unit (201), in particular a cloud storage, wherein the drivers (100*a-e*) are configured to forward commissioning information to the central unit (201) via the mesh network.

11. A method (300) for commissioning a driver (100) for emergency lighting means (101), wherein the driver (100) has a test switch (103) for starting a test routine controlled by a controller of the driver, the method (300) comprising the steps of:

setting (301) the driver (100) to a commissioning mode, and not the test routine, by activating the test switch (103) according to a predefined operation pattern defined by time durations and/or repetition criteria of the operation pattern, wherein the driver (100) in the commissioning mode is configured to receive commissioning data by a subsequent operation of the test switch (103), and     inputting (303) commissioning data by a subsequent operation of the test switch (103), wherein the commissioning data refers to a location of the emergency lighting means (101), in particular a room number, and/or an assignment of the emergency lighting means (101) to a group of lighting means.

12. The method (300) according to claim 11, wherein the setting of the driver (100) to the commissioning mode, the inputting of commissioning data and/or a successful commissioning of the driver (100) are visually signaled by means of a visual status indicator (105), in particular a status LED, of the driver (100).

13. The method (300) according to claim 11, comprising the further step of:

forwarding commissioning information, in particular the commissioning data, to a central unit (201) via a communication interface (107) of the driver (100).

* * * * *